(12) United States Patent
Cao (10) Patent No.: US 7,140,407 B2
(45) Date of Patent: Nov. 28, 2006

(54) CONFIGURATIONS AND DESIGNS FOR STUMP GRINDING TEETH AND CORRESPONDING HOLDING BRACKETS

(76) Inventor: Guofang Cao, 22801 Chardonnay Dr., #1, Diamond Bar, CA (US) 91765

( * ) Notice: Subject to any disclaimer, the term of this patent is extended or adjusted under 35 U.S.C. 154(b) by 119 days.

(21) Appl. No.: 10/781,216

(22) Filed: Feb. 17, 2004

(65) Prior Publication Data

US 2005/0194064 A1 Sep. 8, 2005

(51) Int. Cl.
*B27C 1/00* (2006.01)
*B27C 5/00* (2006.01)
*B27G 13/00* (2006.01)

(52) U.S. Cl. .................. 144/235; 144/230; 144/24.12; 144/241; 407/40; 407/47; 407/48

(58) Field of Classification Search ................ 144/218, 144/230, 240, 241, 176, 24.12, 235; 407/40, 407/47, 48, 107, 113, 117
See application file for complete search history.

(56) References Cited

U.S. PATENT DOCUMENTS

| | | | |
|---|---|---|---|
| 3,626,919 A * | 12/1971 | MacMillan | 123/198 DB |
| 3,971,113 A * | 7/1976 | Budke et al. | 407/118 |
| 4,167,363 A * | 9/1979 | Whitesel | 408/201 |
| 4,209,047 A * | 6/1980 | Weill | 144/208.8 |
| 4,733,995 A * | 3/1988 | Aebi | 407/34 |
| 4,754,789 A * | 7/1988 | Jonsson | 144/241 |
| 4,762,372 A * | 8/1988 | Rassmann et al. | 299/108 |
| 4,889,025 A * | 12/1989 | Collett | 83/835 |
| 5,092,212 A * | 3/1992 | Pawlosky | 83/845 |
| 5,150,992 A * | 9/1992 | Friedmann | 407/110 |
| 6,260,592 B1 * | 7/2001 | Lindholm | 144/208.8 |
| 6,261,032 B1 * | 7/2001 | Duwe et al. | 407/110 |
| 6,565,292 B1 * | 5/2003 | Hecht | 407/110 |

* cited by examiner

Primary Examiner—Bena Miller
(74) Attorney, Agent, or Firm—Jen-Feng Lee, Esq.

(57) ABSTRACT

A new design and configuration for tree stump cutting tooth and its corresponding holding bracket. Notch(s) on the tooth and rib(s) on the bracket are used to allow fast installation of tooth without gauging, reduced the time needed for such necessary tasks. The notch/rib structure also increases the clamping power of the bracket, reducing the possibility that any tooth would fly out, due to the centrifugal force, and cause injury. Wide notches are employed on certain heavy-duty tooth and allow the installation to be done quickly in two positions, and a small range in between the two positions.

1 Claim, 10 Drawing Sheets

CONFIGURATIONS AND DESIGNS FOR STUMP GRINDING TEETH AND CORRESPONDING HOLDING BRACKETS

FIELD AND BACKGROUND OF THE INVENTION

The present invention relates generally to design and configuration of teeth and corresponding holding brackets used on machines for tree stump cutting and grinding. These brackets are sometimes referred to as "pocket" in the industry.

Modem tree stump cutting and grinding machines in general have a rotary disc (or wheel) driven by motor; the disc has multiple teeth attached at the outer edge of the disc so that when the disc is spinning/rotating, the teeth on the edge repeatedly cuts towards the tree stump, or any work piece.

A tooth/pocket design is discussed and disclosed in U.S. Pat. No. 5,279,435. All prior art in the implementation of such tooth/pocket design, however, has at least three disadvantages:

(1) when a new tooth is installed into its pocket, the length of its protrusion outward from the pocket (the portion containing the cutting carbide tip) must be properly gauged; uneven length on the protruding teeth usually results in higher damage rate on the teeth;

(2) to prevent uneven length on the protruding teeth, the installation time needed will increase, depending on the number of teeth being replaces/installed;

(3) the contact surface between the tooth and its pocket is flat; if the clamping power provided by the pocket is lessened, through wear and tear, the tooth could slip out by the very centrifugal force at work;

OBJECTS AND SUMMARY OF THE INVENTION

Present invention provides an improved design and configuration for installing teeth to the holding brackets, by making a notch on the upper side and lower side of the shank portion of a tooth, and a rib is built on the upper side and lower side of the slot of the bracket. Such structure allows the installation of a new tooth to be done instantly when the notch on the tooth is wedged to the ribbed position on the bracket. There is no need to gauge the length of the protruding portion of a newly installed tooth.

The use of rib/notch further increases clamping power of the bracket, and enhances the overall safety of the cutting machine.

Specific implementations may use only one rib on one side (either upper or lower side) of the bracket slot; and the rib need not run the whole width of the side.

DESCRIPTION OF THE DRAWINGS

The accompanying drawings, which are incorporated in and constitute a part of this specification, illustrate the preferred embodiment of the invention and together with the description, serve to explain the principles of the invention. A brief description of the drawings is as follows:

FIG. 5b also shows that the rib on the bracket's receiving slot need not run the whole width of the side, and that only one rib may be sufficient in some implementation.

DETAILED DESCRIPTION OF THE PREFERRED EMBODIMENT

Figure 1:
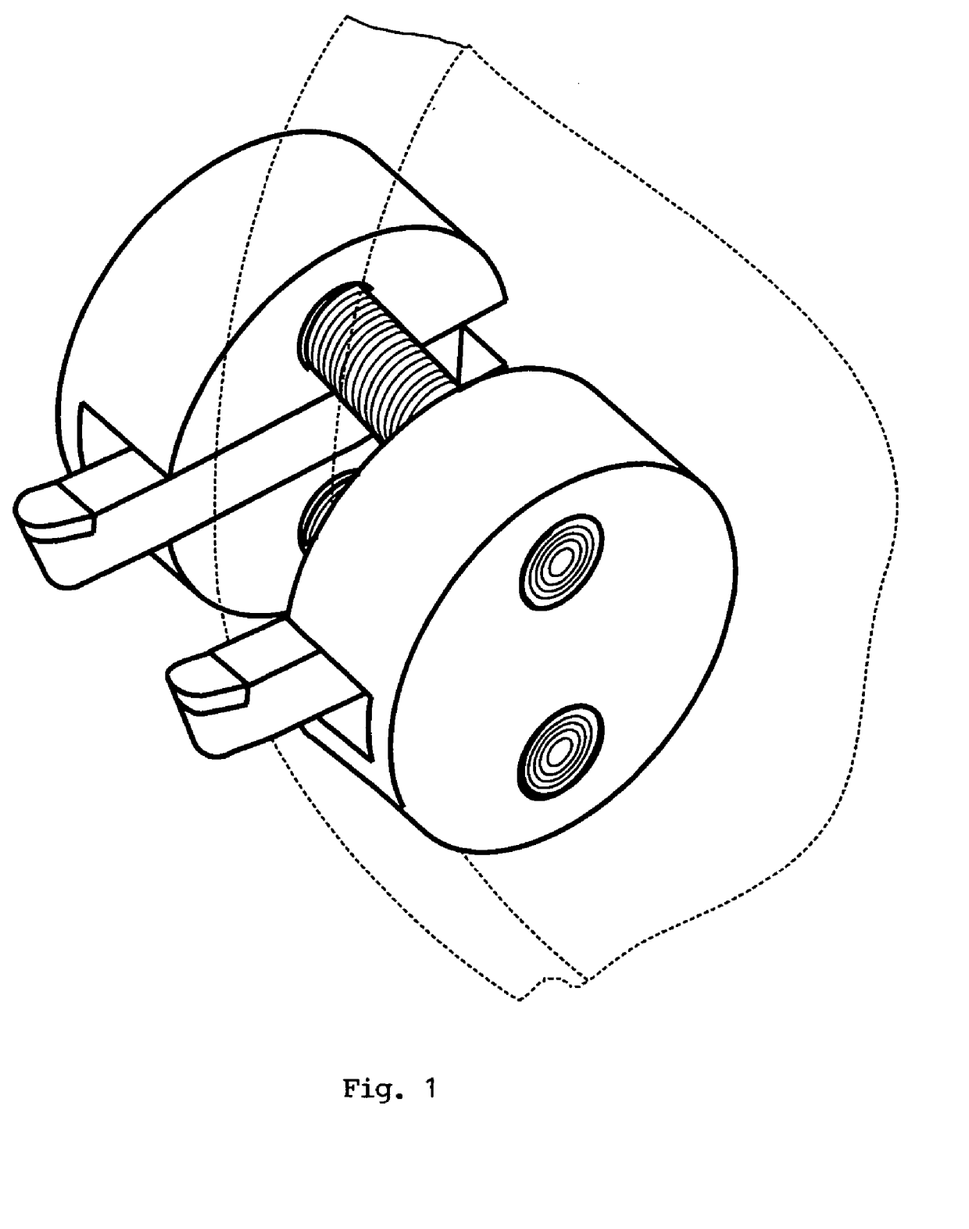
FIG. 1 shows the perspective view of a pair of cutting teeth and holding brackets, as appeared on a cutting disc, which is shown in dotted line. This is prior art known to the industry. At the front end of a tooth is the carbide tip, facing up, which is the cutting point that are used to cut into tree stumps.
Figure 2:
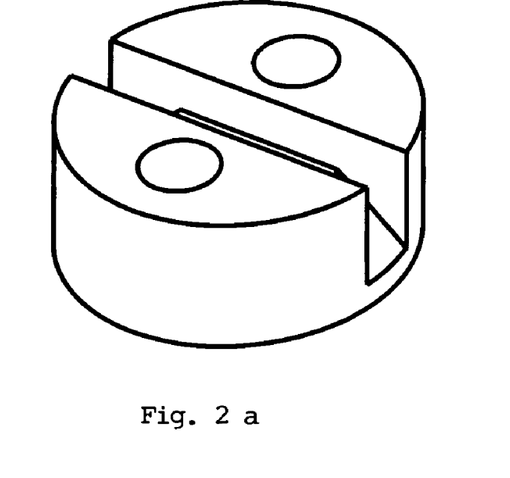
FIGS. 2a and 2b show the side views of a cutting tooth and its holding block.
FIG. 2c is the assembled view of the bracket in FIG. 2a and the tooth in FIG. 2b.
Figure 3:
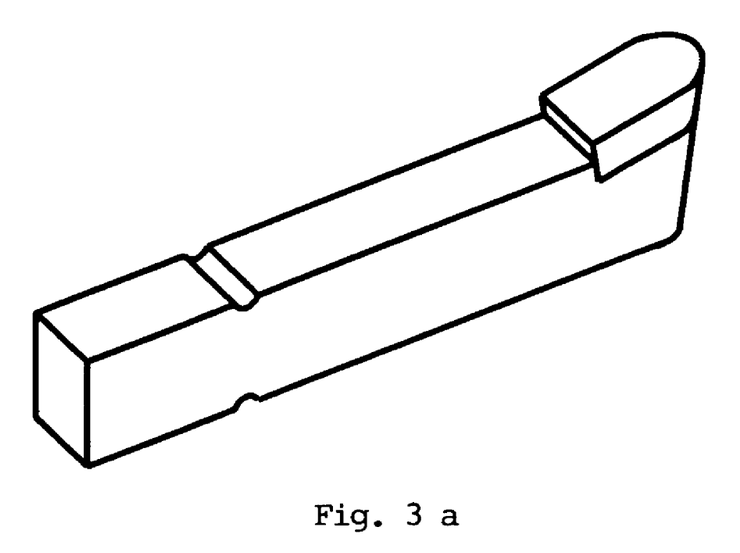
FIG. 3a is the perspective view of a cutting tooth with a pair of notches on the upper and lower sides.
FIG. 3b is the side view of a cutting tooth. An optional second pair of notches, indicated by arrows, are shown, so that the tooth can be aligned to the rib on the bracket in different positions.

In FIG. 3a, the first preferred configuration of present invention is shown. When a cutting tooth is installed to the holding bracket on the rotary disc, the use of the notch on the first side (the top side, in this figure) greatly help reduce the time needed because no gauging is needed. A second notch on the second side (the bottom side) is also shown here in FIG. 3a.

Figure 4:
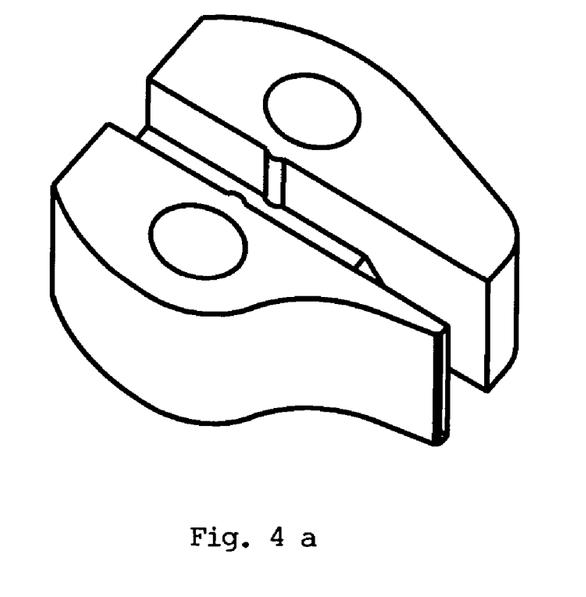
FIGS. 4a and 4b show the holding bracket with a rib on both opposite sides of the slot.

As shown in FIGS. 4a and 4b, the tooth can easily be installed by "clicking" the rib and notch together. Moreover, safety is enhanced because the clamping power is more efficient when the rib/notch mechanism is used. The ribs exist on the first inside surface (top inside) and second inside (bottom inside) of the bracket, for corresponding to the notches on the shank portion of the cutting tooth, as shown in FIGS. 3a and 4a.

FIG. 3b shows that an optional second pair of notches can be built to the shank, so that the tooth can be installed to the bracket in one of two positions quickly. This is for the possibility that when the carbide tip has been badly worn or chipped away a little bit, users can simply re-install the tooth, without time-consuming gauging, by fitting the bracket rib to the second notch position.

Similarly, depending on specific implementations, a third pair of notches, or more, may be used on the shank of a tooth.

Figure 5A:
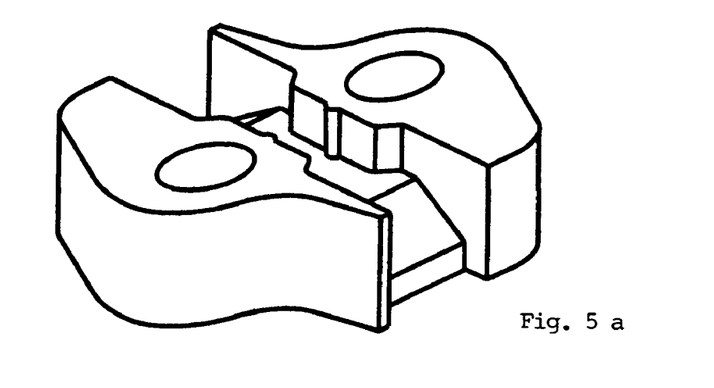
FIGS. 5a, 5b and 5c show the shape of a bracket so that the bracket can be used when it's turned 180 degrees.
Figure 5B:
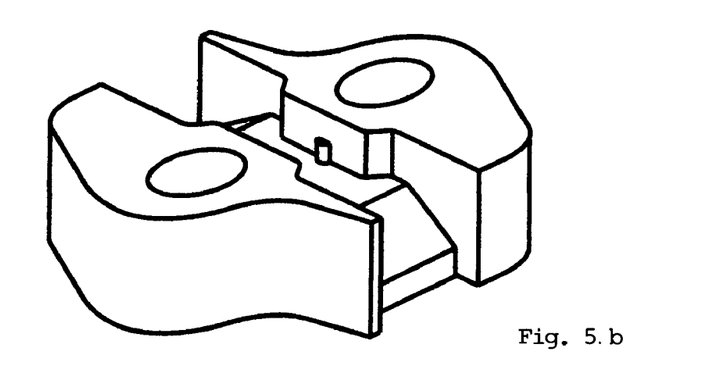

FIG. 5b shows that the rib may be just a portion of the width on one side of the bracket slot. Depending on specific implementation, instead of two ribs on both sides, only one rib may be built to the side of the bracket slot.

Figure 5C:
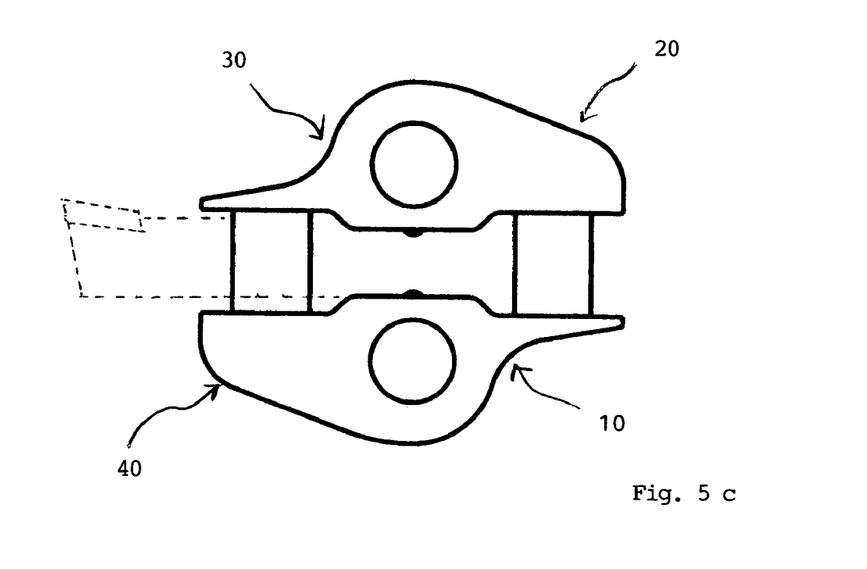

In FIG. 5c, broken lines on the left show the carbide tip is facing upward. The end on the same side as the carbide tip is the leading end 30. On the opposite side is the trailing end 40. When the bracket is turned 180 degrees for installing a cutting tooth, the leading end is 10 and the trailing is 20.

The leading ends 10 and 30 have inward curvature to allow wood chips to be scattered away. The trailing ends 20 and 40 are thicker so that they can withstand the impacting force when the cutting machine is at work.

Figure 6:
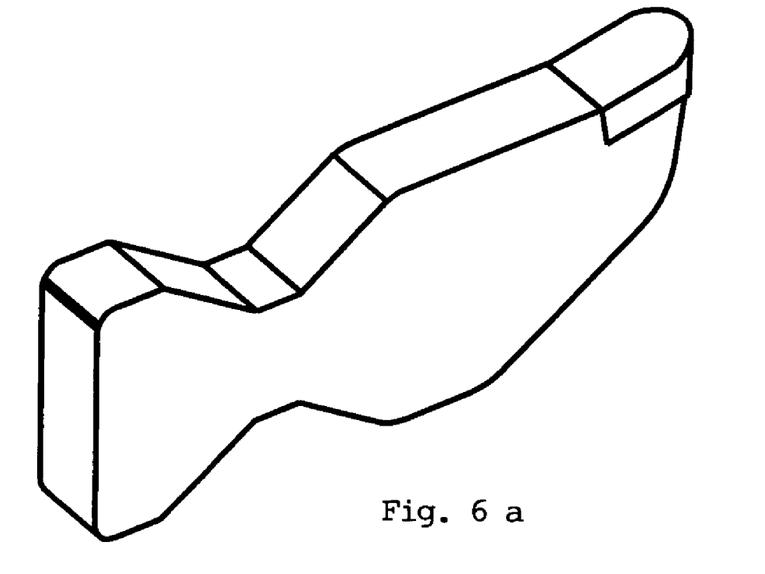
FIGS. 6a and 6b show the construction of a stronger tooth used on heavy-duty cutting jobs. Instead of small notches, wide notches are formed on the shank portion of the tooth.

FIGS. 6a and 6b show wide notches, instead of small notches being used on tooth for heavy-duty jobs.

Figure 7:
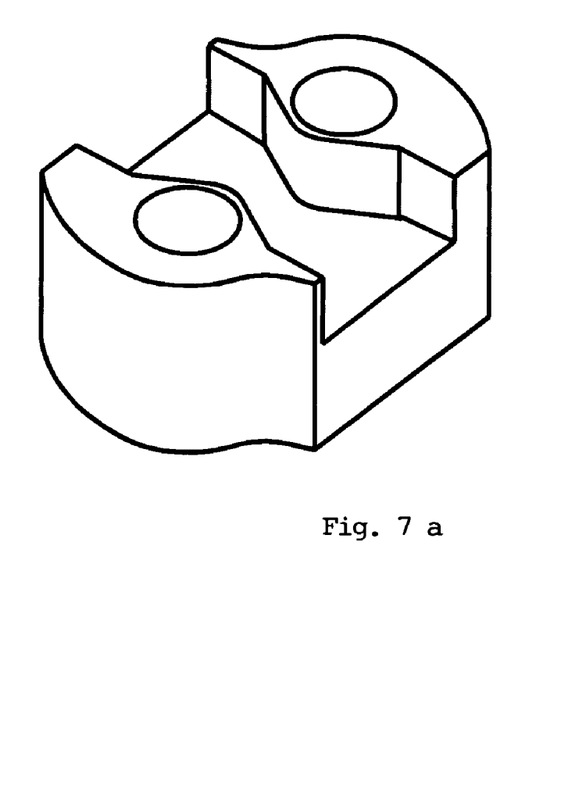
FIGS. 7a and 7b show the holding bracket for the heavy-duty tooth in FIGS. 6a and 6b. Instead of rib(s), rising ridge(s) are used to align the tooth into position.

FIGS. 7a and 7b show a centrally rising ridge on either side of the bracket slot, for the tooth shown in FIGS. 6a and 6b.

Figure 8A:
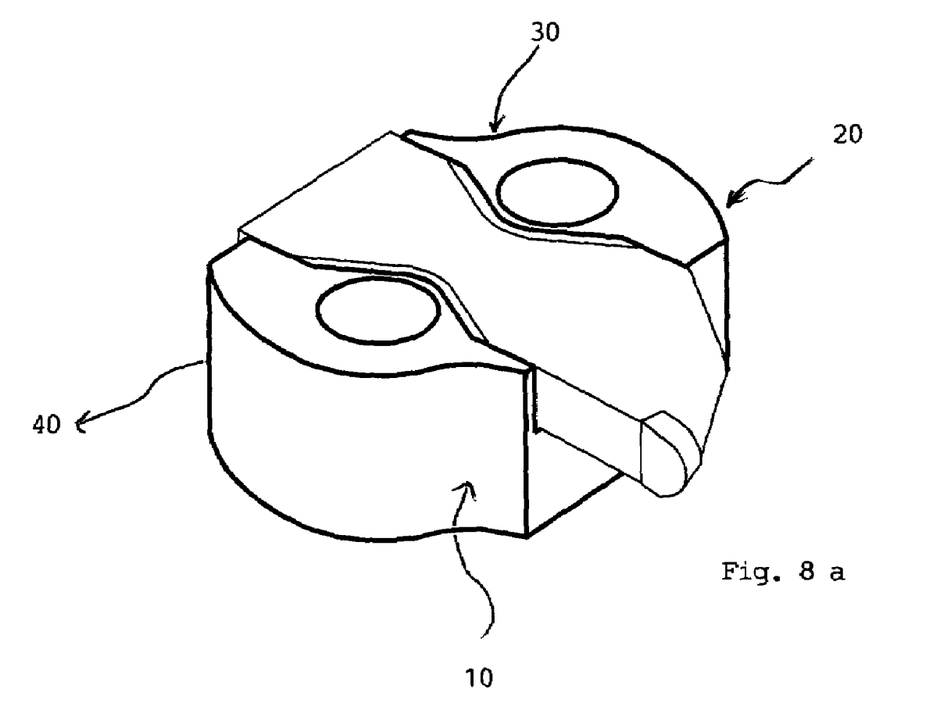
FIGS. 8a and 8b show the assembled view of the heavy-duty type tooth and bracket. Note that due to the intended gap between the tooth and the bracket, the tooth can be aligned in a range of positions.
Figure 8B:
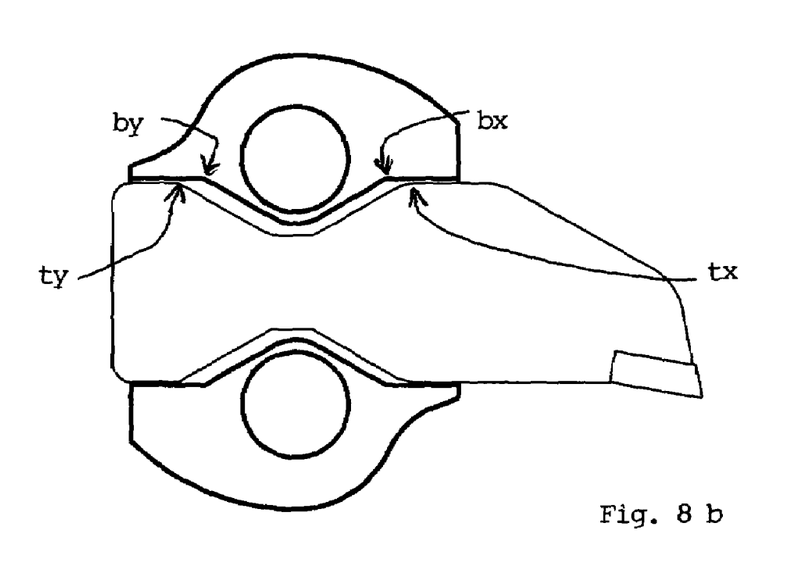

FIGS. 8a and 8b show assembled views of the heavy-duty type tooth and bracket. When assembled, an elongated gap is defined, so that the tooth can be easily aligned at two positions: (1) the contact point formed by engaging tx to bx; (2) the contact point formed by engaging ty to by. Naturally, users can manually set the two positions depending on desired protruding portion of the tooth. The tooth can further be installed within the range defined by the two contact points. This range is relatively narrow and thus no gauging tool is needed, saving time for installation.

Figure 9:
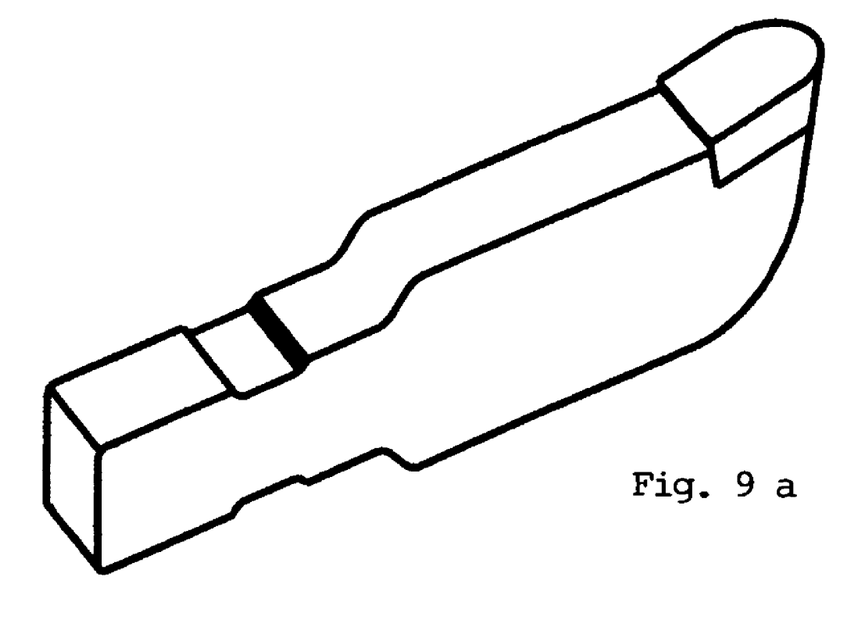
FIGS. 9a and 9b show the combination use of a wide notch inside which a small notch is built on the two sides of the shank portion of a tooth.

FIGS. 9a and 9b show the combination use of a wide notch inside which a small notch is built.

Figure 10:
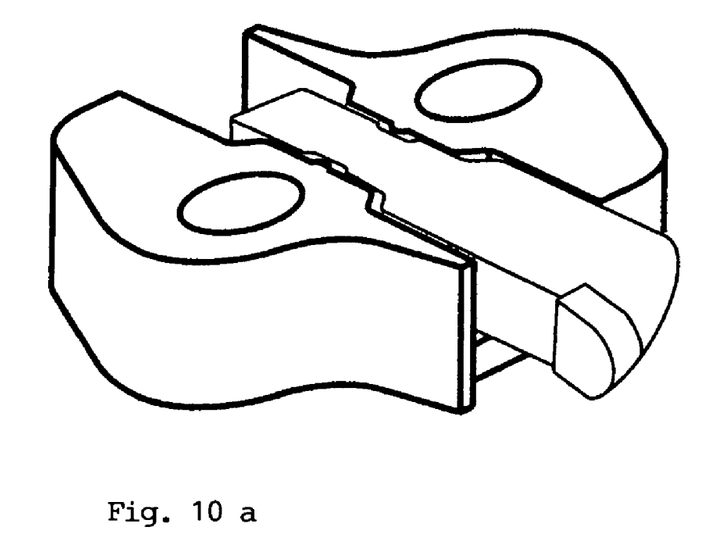
FIGS. 10a and 10b show the assembled view of the wide/small notch combination. The corresponding side on the bracket has a wider ridge and a small rib used for aligning into the wide/small notch on the tooth.

FIGS. 10a and 10b show the assembled view of the bracket with a rising ridge upon which a rib is built, to receive the combination-notch type tooth in FIGS. 9a and 9b.

What is claimed is:

1. New design and configuration of tree stump cutting tooth and corresponding holding bracket, comprising:
   (a) a cutting tooth having a shank portion with a first wide notch formed on a first side of the shank, a second wide notch formed on a second side of the shank; and,
   (b) a holding bracket having protruding ridges formed on both opposite inside surfaces, so that said tooth can be set into said holding bracket in between leftmost and rightmost positions, as a result of the gap between the ridges and its corresponding wide notches on the tooth;
   wherein a narrow notch is formed on said first wide notch on the shank of said cutting tooth, and another narrow notch is formed on said second wide notch on the shank of said cutting tooth, and a smaller rib is formed on each of said protruding ridges on both opposite inside surfaces of said holding bracket, resulting in notch-in-notch combination structure for heavy-duty tree stump cutting use.

* * * * *